United States Patent
Meng et al.

(10) Patent No.: US 10,216,248 B2
(45) Date of Patent: Feb. 26, 2019

(54) METHOD AND DEVICE FOR CONTROLLING POWER CONSUMPTION

(71) Applicant: Xiaomi Inc., Beijing (CN)

(72) Inventors: Deguo Meng, Beijing (CN); Yanlu Zhang, Beijing (CN); Ziguang Gao, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/018,162

(22) Filed: Feb. 8, 2016

(65) Prior Publication Data
US 2016/0239072 A1 Aug. 18, 2016

(30) Foreign Application Priority Data
Feb. 13, 2015 (CN) .......................... 2015 1 0077297

(51) Int. Cl.
*G06F 1/32* (2006.01)
(52) U.S. Cl.
CPC .......... *G06F 1/3234* (2013.01); *G06F 1/3203* (2013.01); *G06F 1/3212* (2013.01)
(58) Field of Classification Search
CPC ..... G06F 1/3234; G06F 1/3212; G06F 1/3203
USPC ................................................. 713/323, 324
See application file for complete search history.

(56) References Cited

U.S. PATENT DOCUMENTS

| 7,457,971 | B2 | 11/2008 | Pineda De Gyvez et al. |
| 8,145,928 | B2* | 3/2012 | de Cesare ............. G06F 1/3203 713/320 |
| 2004/0030874 | A1 | 2/2004 | Qureshi |
| 2004/0153877 | A1* | 8/2004 | Agarwala ............. G06F 11/348 714/48 |

(Continued)

FOREIGN PATENT DOCUMENTS

| CN | 1657301 A | 8/2005 |
| CN | 1795428 A | 6/2006 |

(Continued)

OTHER PUBLICATIONS

International Search Report dated Jan. 28, 2016 for International Application No. PCT/CN2015/093230, 4 pages.

(Continued)

*Primary Examiner* — Austin Hicks
(74) *Attorney, Agent, or Firm* — Arch & Lake LLP

(57) ABSTRACT

The present disclosure relates to a method and a device for controlling power consumption of an electronic device, which belongs to the technical field of smart devices. The method includes determining a type of an operating system of the electronic device, determining a monitoring scheme based on the type of operating system, monitoring in real time whether the operating system currently has a task to perform based on the determined monitoring scheme, and switching the operating system to a reduced power mode from a normal operation mode when the system currently has no task to perform. In the present disclosure, a common (Continued)

power consumption management can be implemented in uniform and brief software architecture. It can facilitate development of a framework, distribution of SDK. Moreover, it can eliminate the need to analyze specific operation characteristics of the devices, independent of the functions of the devices, broadly and flexibly applicable to a variety of devices.

12 Claims, 8 Drawing Sheets

(56) References Cited

U.S. PATENT DOCUMENTS

| | | | |
|---|---|---|---|
| 2006/0248354 A1 | 11/2006 | Pineda De Gyvez et al. | |
| 2007/0240163 A1 | 10/2007 | Conrad et al. | |
| 2008/0031588 A1* | 2/2008 | Leung | H04N 5/76 386/239 |
| 2009/0077404 A1 | 3/2009 | Herring et al. | |
| 2011/0231684 A1 | 9/2011 | Conrad et al. | |
| 2014/0173610 A1 | 6/2014 | Conrad et al. | |
| 2014/0310540 A1* | 10/2014 | Herbeck | G06F 1/3206 713/320 |
| 2015/0011970 A1* | 1/2015 | Kamen | A61M 5/14248 604/504 |

FOREIGN PATENT DOCUMENTS

| | | |
|---|---|---|
| CN | 101315577 A | 12/2008 |
| CN | 101477403 A | 7/2009 |
| CN | 101848094 A | 9/2010 |
| CN | 101884022 A | 11/2010 |
| CN | 103324268 A | 9/2013 |
| CN | 104679218 A | 6/2015 |
| JP | 2012074958 A | 4/2012 |
| KR | 10-2006-0032079 A | 4/2006 |
| RU | 2409832 C1 | 1/2011 |
| WO | WO 2012004948 A1 | 1/2012 |

OTHER PUBLICATIONS

Office Action for Japanese patent application No. 2016-574328 dated Mar. 28, 2017, 2 pages.
Notice of Allowance for Korean patent application No. 020220954 dated Mar. 20, 2017, 5 pages.
Research on Node Operation System of Wireless Sensor Networks (including Abstract in English); Li Jing et al.; Institute of Broadband Network, Northwestern Polytechnical University, Xi an Shanxi 710072, China; Aug. 1, 2006; pp. 28-30.
International Search Report (including English translation) issued in corresponding International Application No. PCT/CN2015/093230, dated Jan. 28, 2016, 4 pages.
Extended European Search Report issued in corresponding EP Application No. EP16155599, dated Jun. 21, 2016, 8 pages.
Office Action (including English translation) issued in corresponding Korean Patent Application No. 10-2015-7036598, dated Sep. 23, 2016, 9 pages.
Office Action (including English translation) issued in corresponding Chinese Patent Application No. 201510077297.6, dated Oct. 24, 2016, 17 pages.
Office Action (including English translation) issued in corresponding Russian Patent Application No. 2016113187/07(020675), dated Aug. 2, 2017, 11 pages.
European Office Action issued in corresponding EP Patent Application No. 16155599.0, dated Oct. 26, 2018, 6 pages.
Miro Samek: "Use an MCU's low-power modes in foreground/background systems", EE Times-India, Oct. 1, 2007, XP055516632, Retrieved from the Internet: URL:https://www.state-machine.com/doc/ Samek0710.pdf [retrieved on Oct. 18, 2018], 4 pages.

* cited by examiner

US 10,216,248 B2

METHOD AND DEVICE FOR CONTROLLING POWER CONSUMPTION

CROSS-REFERENCE TO RELATED APPLICATIONS

The present application is based upon and claims priority to Chinese Patent Application No. 201510077297.6, filed Feb. 13, 2015, the entire contents of which are incorporated herein by reference.

TECHNICAL FIELD

The present disclosure generally relates to the technical field of smart devices, and more particularly, to a method and a device for controlling power consumption.

BACKGROUND

Power consumption management is very important for embedded systems, especially for small battery-powered devices. Longer standby time is an important factor for excellent user experience. Therefore, manufacturers of various devices try their best to optimize power consumption. The power consumption management scheme can vary depending on different devices and different application situations.

Currently, a commonly used power consumption optimization method is managing power consumption based on a function of a product. A corresponding power consumption reducing scheme is designed in consideration of operation characteristics of a specific product. For example, for an attitude detector, the sampling of the sensor can be ceased when the attitude detector is motionless for a long time, so as to reduce the power consumption of the attitude detector.

SUMMARY

According to a first aspect of embodiments of the present disclosure, there is provided a method for controlling the power consumption of an electronic device by a power control device, including determining a type of an operating system of the electronic device, determining a monitoring scheme based on the type of operating system, monitoring in real time whether the operating system currently has a task to perform based on the determined monitoring scheme, and switching the operating system to a reduced power mode from a normal operation mode when the operating system currently has no task to perform.

According to a second aspect of embodiments of the present disclosure, there is provided a power control device for controlling power consumption of an electronic device, including a processor, and a memory for storing instructions executable by the processor. The processor is configured to perform determining a type of an operating system of the electronic device, determining a monitoring scheme based on the type of operating system, monitoring in real time whether the operating system currently has a task to perform based on the determined monitoring scheme, and switching the operating system to a reduced power mode from a normal operation mode when the operating system currently has no task to perform.

According to a third aspect of embodiments of the present disclosure, there is provided a non-transitory computer-readable storage medium storing instructions that, when being executed by a processor of a power control device, cause the power control device to perform determining a type of an operating system of an electronic device, determining a monitoring scheme based on the type of operating system, monitoring in real time whether the operating system currently has a task to perform based on the determined monitoring scheme, and switching the operating system to a reduced power mode from a normal operation mode when the operating system currently has no task to perform.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with some aspects related to the invention as recited in the appended claims.

The method and device for controlling power consumption involved in the present disclosure are applied in an electronic device including but not limited to: a terminal, a server, a domestic appliance and the like. The terminal includes but not limited to: a computer, a mobile phone, a tablet computer and the like. The domestic appliance includes but not limited to: a refrigerator, a washing machine, a microwave oven, an air conditioner and the like. A system involved in the present disclosure refers to an operating system in the electronic device. Optionally, the system is an embedded system. The type of the system is not limited. For example, the system can be a foreground-background system, or a real-time system supporting preemption, etc.

Figure 1:
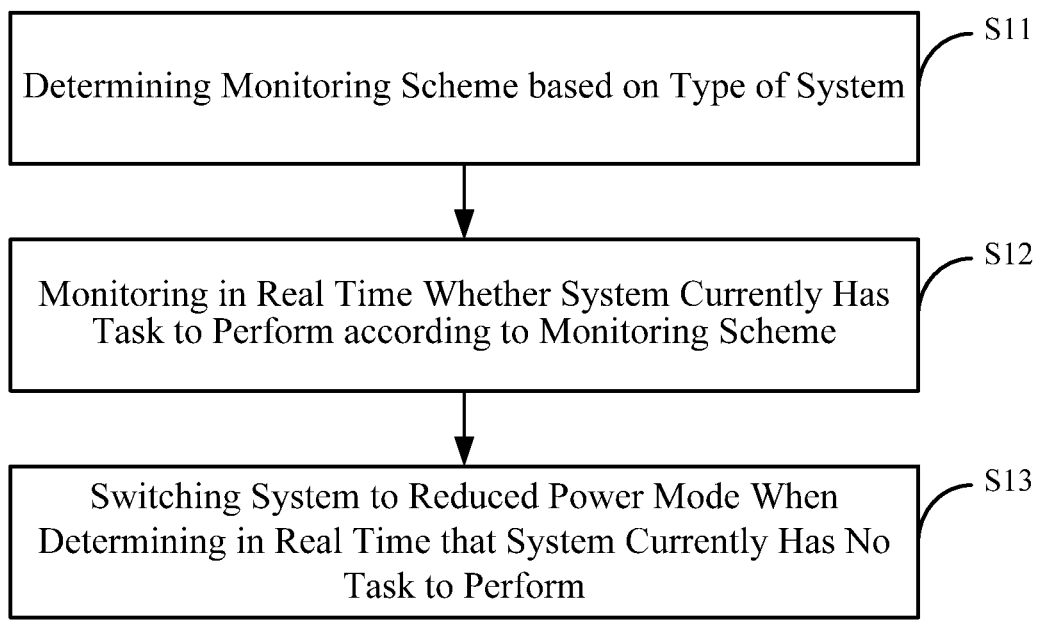
FIG. 1 is a flow chart showing a method for controlling power consumption according to an exemplary embodiment.

FIG. 1 is a flow chart showing a method for controlling power consumption according to an exemplary embodiment. As shown in FIG. 1, the method is applied in an electronic device, and includes the following steps.

In step S11, a monitoring scheme is determined based on a type of a system. In the present embodiment, the system refers to an operating system of the electronic device, which includes but not limited to a foreground-background system, or a real-time system supporting preemption, etc. The monitoring scheme is used to monitor whether the system has a task to perform, and the monitoring scheme is different depending on a type of the system.

In step S12, it is monitored in real time whether the system currently has a task to perform according to the monitoring scheme. In the present embodiment, when the system has a task to perform, the power consumption for the electronic device should not be reduced, so as to ensure that the task can be properly performed. Generally, when the system has no task to perform, the power consumption can be reduced so as to save power for the electronic device, saving valuable resources.

In step S13, the system is switched to a reduced power mode from a normal operation mode when it is determined in real time that the system currently has no task to perform. In the present embodiment, operation modes of the system can include a normal operation mode and a reduced power mode. The system is in the normal operation mode when the system is performing a task, and the system is in the reduced power mode when the system is not performing a task. The system has a lower power consumption in the reduced power mode than in the normal operation mode, thereby it can save power and improve the performance of the electronic device.

In the present embodiment, when the system is a foreground-background system, the monitoring scheme is determined to be a scheme of monitoring in real time whether a task is triggered by an interrupting event in foreground. Alternatively, when the system is a real-time system supporting preemption, the monitoring scheme is determined to be a scheme of monitoring in real time a task based on a priority level.

In the present embodiment, optionally, when the system is a foreground-background system, monitoring in real time whether the system currently has a task to perform according to the monitoring scheme can include: monitoring in real time in a main cycle of the system whether a task is currently triggered by an interrupting event, when a task is triggered by an interrupting event, determining that the system currently has a task to perform, and when no task is triggered by an interrupting event, determining that the system currently has no task to perform.

In the present embodiment, optionally, when the system is a real-time system supporting preemption, monitoring in real time whether the system currently has a task to perform according to the monitoring scheme can include: monitoring in real time for each priority level whether a process is triggered, wherein a first process for performing switching to the reduced power mode has a lowest priority level, when no process other than the first process is triggered, determining that the system currently has no task to perform, and when any process other than the first process is triggered, determining that the system currently has a task to perform.

In the present embodiment, optionally, switching the system to a reduced power mode can include but not limited to one or more of: lowering a frequency of a central processor, lowering a supply voltage to a micro control unit (MCU), switching the MCU to a reduced power mode, ceasing power supply to a designated peripheral device, and ceasing power supply to a peripheral clock.

In the present embodiment, optionally, the above method can also include: when an interrupting event occurs, terminating the reduced power mode and processing the interrupting event.

In the above method provided by the present embodiment, a monitoring scheme is determined based on a type of a system. It is monitored in real time whether the system currently has a task to perform according to the monitoring scheme. The system is switched to a reduced power mode when it is determined in real time that the system currently has no task to perform. Thereby, a common power consumption management can be implemented in uniform and brief software architecture. It can facilitate development of a framework and Software Development Kit (SDK) of the device. Moreover, it can eliminate the need to analyze specific operation characteristics of the devices, independent of the functions of the devices, broadly and flexibly applicable to a variety of devices.

Figure 2:
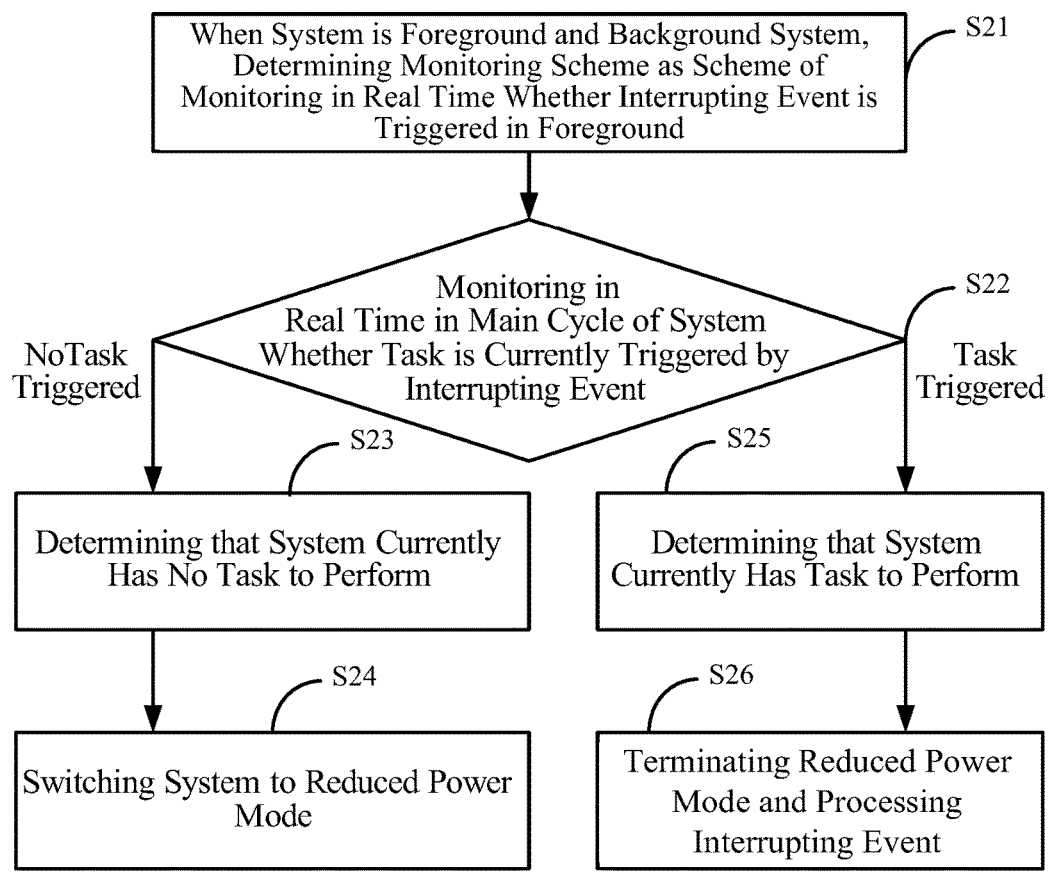
FIG. 2 is a flow chart showing a method for controlling power consumption according to another exemplary embodiment.

FIG. 2 is a flow chart showing a method for controlling power consumption according to another exemplary embodiment. As shown in FIG. 2, the method is applied in an electronic device and includes the following steps.

In step S21, when the system is a foreground-background system, the monitoring scheme is determined to be a scheme of monitoring in real time whether a task is triggered by an interrupting event in foreground.

The foreground-background system refers to a system operating partly in foreground and partly in background. The foreground part is used to monitor an interrupting event, and the background part is used to perform a specific task. An interrupting event monitored by the foreground part can trigger the background part to perform a corresponding task. A foreground-background system has a main cycle for processing schedule of all the tasks. The system also has a task queue in which all the tasks to be performed is waiting to be processed. The main cycle will invoke a task performing function to process a corresponding task.

In step S22, it is monitored in real time in the main cycle of the system whether a task is currently triggered by an interrupting event. When no task is triggered by an interrupting event, it is proceeded to step S23. When a task is triggered by an interrupting event, it is proceeded to step S25.

In the present embodiment, depending on the type of an interrupting event, the interrupting event can trigger a task, or does not trigger a task. When a task is triggered by an interrupting event, the task will be scheduled in a task queue of the main cycle. Thus, it can be determined that the system currently has a task to perform. When no task is triggered by an interrupting event, the task queue of the main cycle will be empty. Accordingly, it can be determined that the system currently has no task to perform.

In step S23, it is determined that the system currently has no task to perform.

In step S24, the system is switched to a reduced power mode, and the procedure ends. Switching the system to a reduced power mode can include but not limited to one or more of: lowering a frequency of a central processor, lowering a supply voltage to a micro control unit (MCU), switching the MCU to a reduced power mode, ceasing power supply to a designated peripheral device; and ceasing power supply to a peripheral clock. The designated peripheral device can be a peripheral device not in operation. However, the present disclosure is not limited thereto.

In step S25, it is determined that the system currently has a task to perform.

In step S26, the reduced power mode is terminated and the interrupting event is processed. The procedure ends.

In the present embodiment, optionally, the determination can be performed in the main cycle of the foreground-background system. If there is a task to be performed in the task queue, a corresponding task performing function is invoked to process the corresponding task. If there is no task to be performed in the task queue, a function for a reduced power mode is invoked to switch the system to the reduced power mode.

The above procedure can be implemented as the following codes:

```
While(1) {
        While(has_task_in_queue(task_queue)) {   //when there is a task in the task queue
                Execute_task( )          //perform the corresponding task
        }
        Enter_lowpower_mode( );   // enter a reduced power mode when there is no task in the task queue
}
```

Wherein, While(1) is a main cycle, While(has_task_in_queue(task_queue)) is a processing function of the task queue. In the function, when it is determined that there is a task to be performed in the task queue, it will invoke the function Execute_task( ) to perform the corresponding task. If the condition that there is a task in the task queue is not satisfied, the function Enter_lowpower_mode( ) will be performed to switch the system to the reduced power mode. In the present embodiment, the interrupting event can wake up the system from the reduced power mode, and trigger the system to perform the corresponding task.

In the above method provided by the present embodiment, for a foreground-background system, the monitoring scheme is determined as monitoring in real time at foreground a task triggered by an interrupting event. It is monitored in real time whether the system currently has a task triggered by an interrupting event based on this monitoring scheme. When it is monitored in real time that the system currently has a task to perform, the system is switched to a reduce power mode. Thereby, a common power consumption management can be implemented in uniform and brief software architecture. It can facilitate development of a framework, distribution of SDK. It is desirable providing to a user a project of a software framework that can be further developed by the user and irrelevant to power management. Moreover, it can eliminate the need to analyze specific operation characteristics of the devices, independent of the functions of the devices, broadly and flexibly applicable to a variety of devices.

Figure 3:
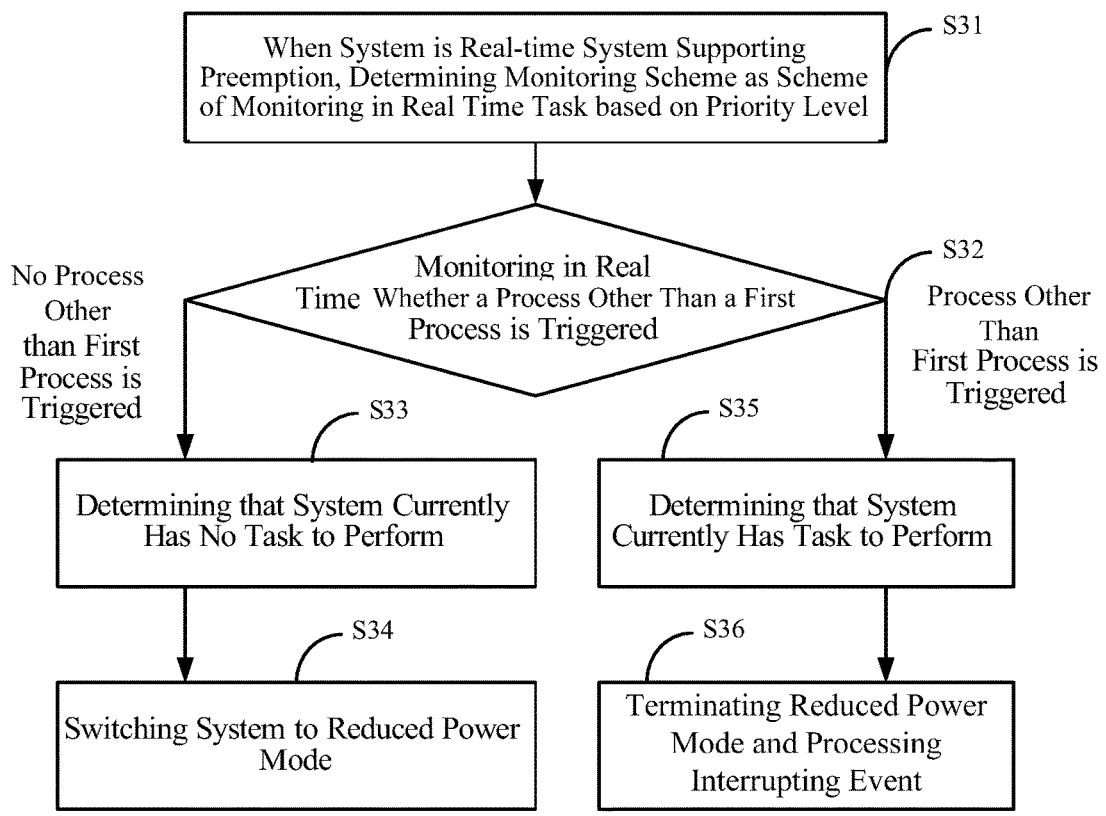
FIG. 3 is a flow chart showing a method for controlling power consumption according to another exemplary embodiment.

FIG. 3 is a flow chart showing a method for controlling power consumption according to another exemplary embodiment. As shown in FIG. 3, the method is applied in an electronic device and includes the following steps.

In step S31, when the system is a real-time system supporting preemption, the monitoring scheme is determined to be a scheme of monitoring in real time a task based on a priority level. The real-time system supporting preemption refers to a system which creates processes of different priority levels to perform tasks, in which a process of a higher priority level is performed in priority, to ensure that the task of a higher priority level can be processed in priority.

In step S32, it is monitored in real time whether a process other than a first process is triggered. The first process for performing switching the system to the reduced power mode has a lowest priority level. When no process other than the first process is triggered, it is proceeded to step S33. When any process other than the first process is triggered, it is proceeded to step S35.

In the present embodiment, the first process for performing switching the system to the reduced power mode has a lowest priority level, and any process other than the first process has a higher priority level than the first process. Thus, only when no process other than the first process is triggered, the first process is performed, and when any process other than the first process is triggered, the first process will not be performed. In this way, it can be ensured that only when it has not any task to perform, the system will operate in the reduced power mode, and thus the normal performances of the tasks will not be influenced.

In step S33, it is determined that the system currently has no task to perform.

In step S34, the system is switched to a reduced power mode, and the procedure ends. Switching the system to a reduced power mode can include but not limited to one or more of: lowering a frequency of a central processor; lowering a supply voltage to a micro control unit (MCU), switching the MCU to a reduced power mode, ceasing power supply to a designated peripheral device, and ceasing power supply to a peripheral clock.

In step S35, it is determined that the system currently has a task to perform.

In step S36, the reduced power mode is terminated and the interrupting event is processed. The procedure ends.

The above process of switching to a reduced power mode provided by the present embodiment can be implemented as the following codes:

```
    Void lowest_priority_task( ) {         //process function of the process of the lowest
priority level
        While(1) {
            Enter_low_power_mode( );    //entering the reduced power mode
        }
    }
```

Wherein, lowest_priority_task( ) is the process of the lowest priority level, which is for triggering switching the system into the reduced power mode. When no process other than the first process is triggered, this process will be automatically triggered. In this process, the function Enter_low_power_mode( ) will be performed to switch the system to operate in the reduce power mode.

In the real-time system supporting preemption, a process corresponding to an interrupting event has a highest priority level, and when it occurs, the interrupting event will preempt the priority of the first process, and trigger the process corresponding to the interrupting event in priority such that the process performs a corresponding function to process a task corresponding to the interrupting event. This will wake up the system from the reduced power mode to ensure the task of a higher priority level is performed. Such a mechanism that the system will enter the reduced power mode only when it is idle and has no task to perform. It can facilitate management of power consumption without influencing the real-time property of the system.

In the above method provided by the present embodiment, for a real-time system supporting preemption, the monitoring scheme is determined as monitoring in real time a task based on a priority level. It is monitored in real time whether the system currently has a task to perform based on this monitoring scheme, and when it is monitored in real time that the system currently has a task to perform, the system is switched to a reduce power mode. Thereby, a common power consumption management can be implemented in uniform and brief software architecture. It can facilitate development of a framework, distribution of SDK. Moreover, it can eliminate the need to analyze specific operation characteristics of the devices, independent of the functions of the devices, broadly and flexibly applicable to a variety of devices.

Figure 4:
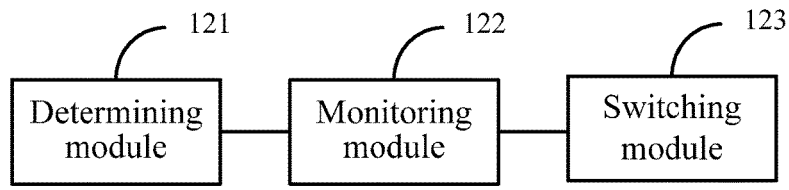
FIG. 4 is a block diagram showing a device for controlling power consumption according to another exemplary embodiment.

FIG. 4 is a block diagram showing a power control device for controlling power consumption according to another exemplary embodiment. As shown in FIG. 4, the device includes a determining module 121, a monitoring module 122 and a switching module 123.

The determining module 121 is configured to determine a monitoring scheme based on a type of an operating system of an electronic device. The monitoring module 122 is configured to monitor in real time whether the operating system currently has a task to perform according to the monitoring scheme. The switching module 123 is configured to switch the system to a reduced power mode when it is determined in real time that the system currently has no task to perform.

Figure 5:
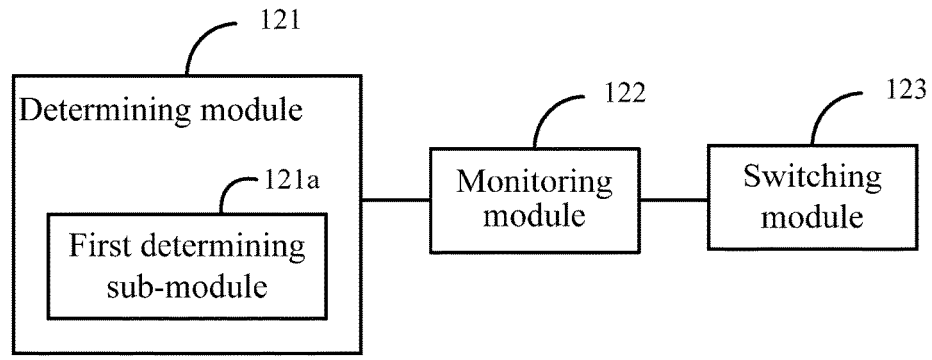
FIG. 5 is a block diagram showing a device for controlling power consumption according to another exemplary embodiment.

Referring to FIG. 5, in the present embodiment, optionally, the determining module 121 may include a first determining sub-module 121a configured to, when the operating system is a foreground-background system, determine the monitoring scheme as a scheme of monitoring in real time whether a task is triggered by an interrupting event in foreground.

Figure 6:
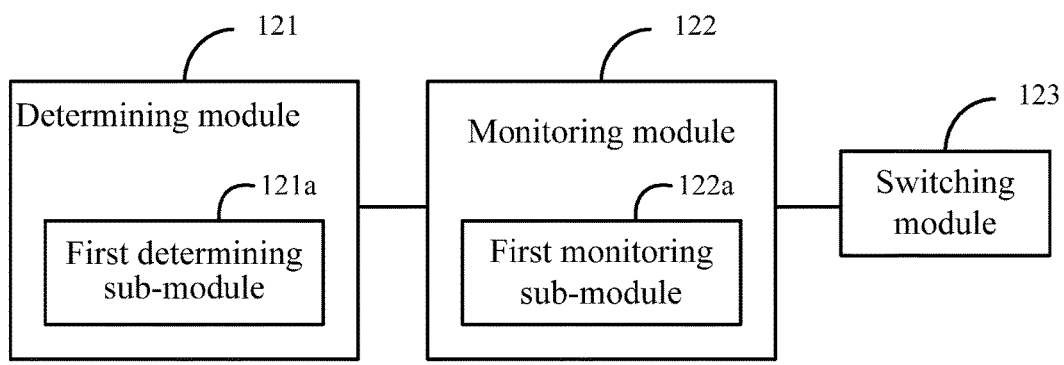
FIG. 6 is a block diagram showing a device for controlling power consumption according to another exemplary embodiment.

Referring to FIG. 6, in the present embodiment, optionally, the monitoring module 122 may include a first monitoring sub-module 122a configured to monitor in real time in a main cycle of the system whether a task is currently triggered by an interrupting event. When a task is triggered by an interrupting event, the first monitoring sub-module 122a determines that the system currently has a task to perform. When no task is triggered by an interrupting event, the first monitoring sub-module 122a determines that the system currently has no task to perform.

Figure 7:
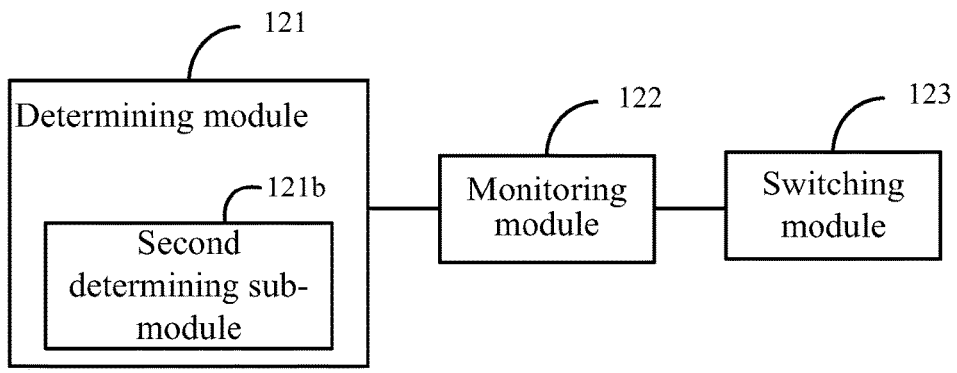
FIG. 7 is a block diagram showing a device for controlling power consumption according to another exemplary embodiment.

Referring to FIG. 7, in the present embodiment, optionally, the determining module 121 may include a second determining sub-module 121b configured to, when the system is a real-time system supporting preemption, determine the monitoring scheme as a scheme of monitoring in real time a task based on a priority level.

Figure 8:
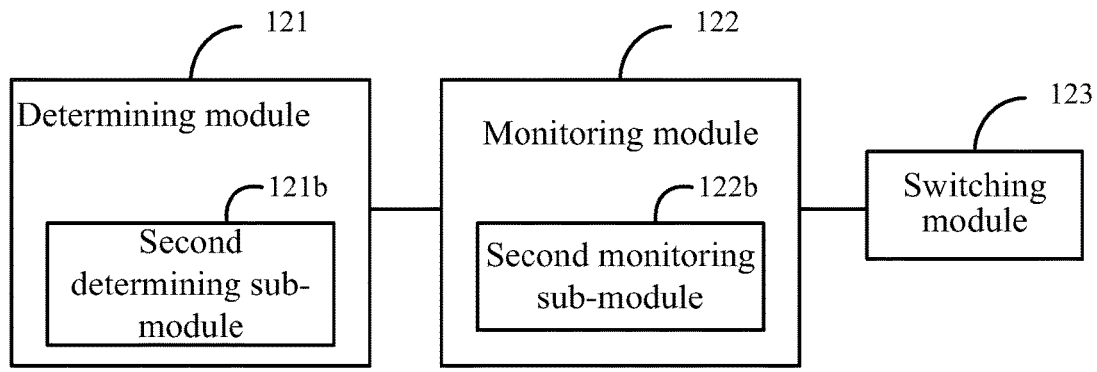
FIG. 8 is a block diagram showing a device for controlling power consumption according to another exemplary embodiment.

Referring to FIG. 8, in the present embodiment, optionally, the monitoring module 122 may include a second monitoring sub-module 122b configured to monitor in real time for each priority level whether a process is triggered, wherein a first process for performing switching to the reduced power mode has a lowest priority level, when neither of the other processes than the first process is triggered, determine that the system currently has no task to perform, and when any one of the other processes than the first process is triggered, determine that the system currently has a task to perform.

Figure 9:
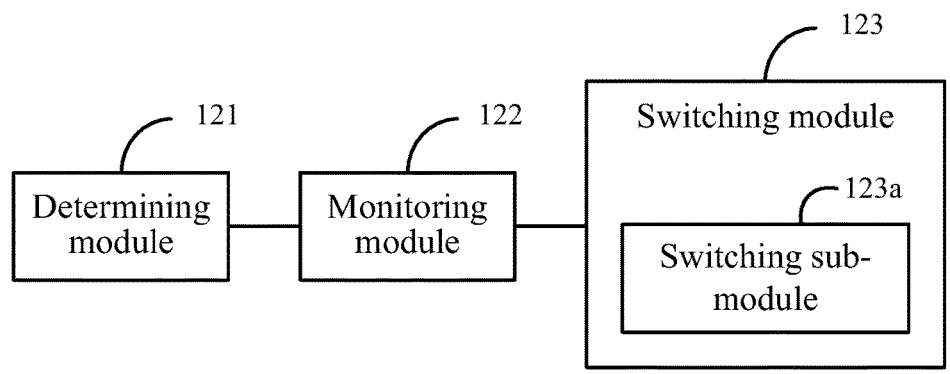
FIG. 9 is a block diagram showing a device for controlling power consumption according to another exemplary embodiment.

Referring to FIG. 9, in the present embodiment, optionally, the switching module 123 may include a switching sub-module 123a configured to perform one or more of the following when it is monitored in real time that the system currently has no task to perform: lowering a frequency of a central processor, lowering a supply voltage to a micro control unit, switching the micro control unit to a reduced power mode, ceasing power supply to a designated peripheral device; and ceasing power supply to a peripheral clock.

Figure 10:
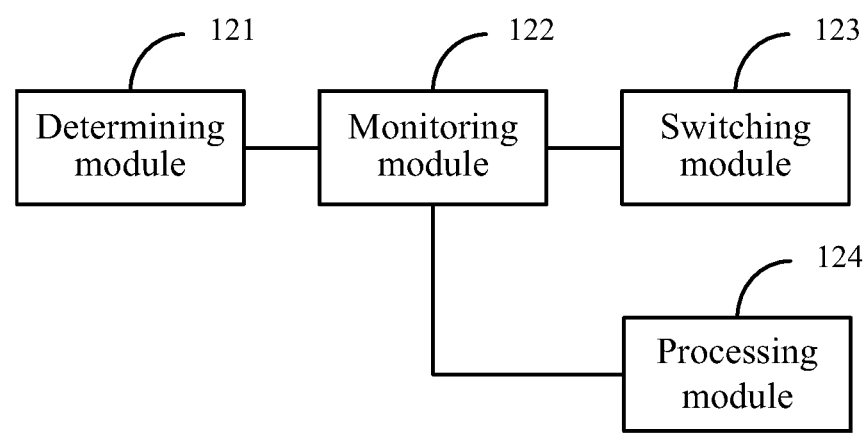
FIG. 10 is a block diagram showing a device for controlling power consumption according to another exemplary embodiment.

Referring to FIG. 10, in the present embodiment, optionally, the switching module 123 is further configured to, when it is monitored in real time that an interrupting event occurs, terminate the reduced power mode. The above device may also include a processing module 124 configured to process the interrupting event monitored in real time. With respect to the devices in the above embodiments, the specific manners for performing operations for individual modules therein have been described in detail in the embodiments regarding the relevant methods, which will not be elaborated herein.

The above device provided by the present embodiment can be applied in any electronic device including but not limited to a terminal, a server, and a domestic appliance.

In the above device provided by the present embodiment, a monitoring scheme is determined based on a type of an operating system. It is monitored in real time whether the operating system currently has a task to perform according to the monitoring scheme. The operating system is switched to a reduced power mode when it is determined in real time that the operating system currently has no task to perform. Thereby, a common power consumption management can be implemented in uniform and brief software architecture. It can facilitate development of a framework, distribution of SDK. Moreover, it can eliminate the need to analyze specific operation characteristics of the devices, independent of the functions of the devices, broadly and flexibly applicable to a variety of devices.

Figure 11:
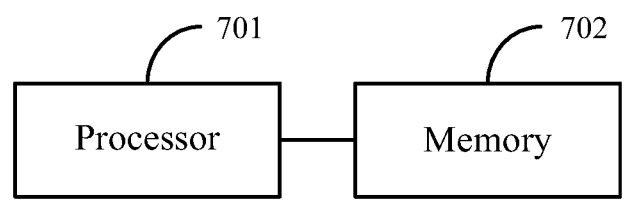
FIG. 11 is a block diagram showing a device for controlling power consumption according to another exemplary embodiment.

FIG. 11 is a block diagram showing a power control device for controlling power consumption according to another exemplary embodiment. As shown in FIG. 11, the power control device includes a processor 701 and a memory 702 for storing instructions executable by the processor. The processor 701 is configured to perform determining a type of an operating system of an electronic device, determining a monitoring scheme based on the type of the operating system, monitoring in real time whether the operating system currently has a task to perform based on the determined monitoring scheme, and switching the system to a reduced power mode when determining in real time that the system currently has no task to perform.

Determining a monitoring scheme based on a type of a system includes when the system is a foreground-background system, determining the monitoring scheme as a scheme of monitoring in real time whether a task is triggered by an interrupting event in foreground.

Monitoring in real time whether the system currently has a task to perform according to the monitoring scheme includes monitoring in real time in a main cycle of the system whether a task is currently triggered by an interrupting event, when a task is triggered by an interrupting event, determining that the system currently has a task to perform, and when no task is triggered by an interrupting event, determining that the system currently has no task to perform.

Determining a monitoring scheme based on a type of a system includes when the system is a real-time system supporting preemption, determining the monitoring scheme as a scheme of monitoring in real time a task based on a priority level.

Monitoring in real time whether the system currently has a task to perform according to the monitoring scheme includes monitoring in real time whether a process other than a first process is triggered. The first process for performing switching to the reduced power mode has a lowest priority level, when no process other than the first process is triggered, determining that the system currently has no task to perform, and when a process other than the first process is triggered, determining that the system currently has a task to perform.

Switching the system to a reduced power mode includes one or more of: lowering a frequency of a central processor, lowering a supply voltage to a micro control unit, switching the micro control unit to a reduced power mode, ceasing power supply to a designated peripheral device, and ceasing power supply to a peripheral clock.

The processor 701 is configured to perform when an interrupting event occurs, terminating the reduced power mode and processing the interrupting event.

Figure 12:
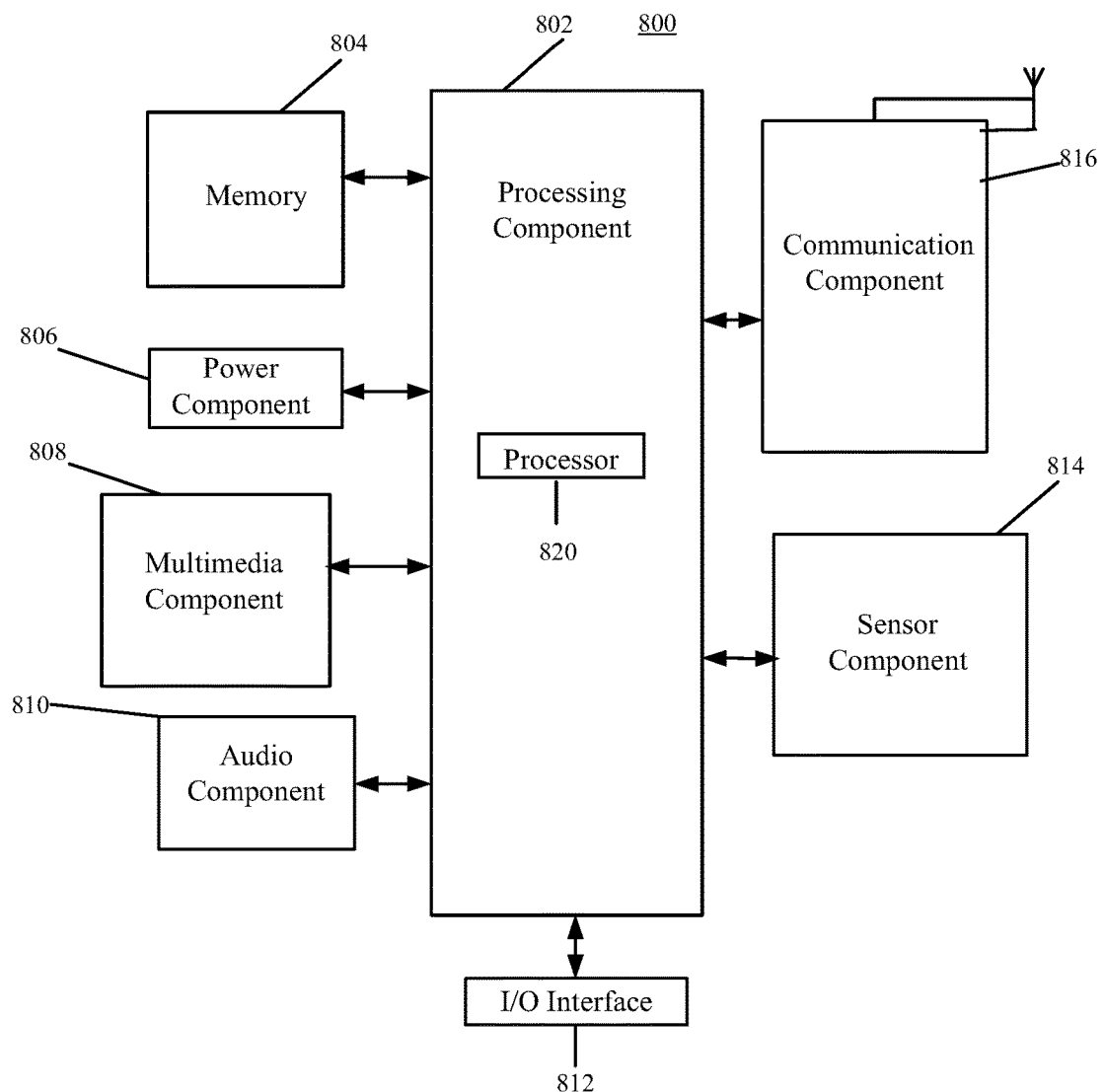
FIG. 12 is a block diagram showing a device for controlling power consumption according to another exemplary embodiment.

FIG. 12 is a block diagram of a device 800 for controlling power consumption, according to another exemplary embodiment. For example, the device 800 may be a mobile phone, a computer, a digital broadcast terminal, a messaging device, a gaming console, a tablet, a medical device, exercise equipment, a personal digital assistant, and the like.

Referring to FIG. 12, the device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the device 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the device 800. Examples of such data include instructions for any applications or methods operated on the device 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the device 800. The power component 806 may include a power management system, one or more power sources, and any other components associated with the generation, management, and distribution of power in the device 800.

The multimedia component 808 includes a screen providing an output interface between the device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the device 800. For instance, the sensor component 814 may detect an open/closed status of the device 800, relative positioning of components, e.g., the display and the keypad, of the device 800, a change in position of the device 800 or a component of the device 800, a presence or absence of user contact with the device 800, an orientation or an acceleration/deceleration of the device 800, and a change in temperature of the device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the device 800 and other devices. The device 800 can access a wireless network based on a communication standard, such as WiFi, 2G, or 3G, or a combination thereof. In one exemplary embodiment, the communication component 816 receives a broadcast signal or broadcast associated information from an external broadcast management system via a broadcast channel. In one exemplary further embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the method provided by any of the above embodiments.

In exemplary embodiments, there is also provided a non-transitory computer-readable storage medium including instructions, such as included in the memory 804, executable by the processor 820 in the device 800, for performing the above-described methods. For example, the non-transitory computer-readable storage medium may be a ROM, a RAM, a CD-ROM, a magnetic tape, a floppy disc, an optical data storage device, and the like.

In the above non-transitory computer-readable storage medium provided by the present embodiment, a monitoring scheme is determined based on a type of an operating system. It is monitored in real time whether the operating system currently has a task to perform according to the monitoring scheme, and the system is switched to a reduced power mode when it is determined in real time that the system currently has no task to perform. Thereby, a common power consumption management can be implemented in uniform and brief software architecture. It can facilitate development of a framework, distribution of SDK. Moreover, it can eliminate the need to analyze specific operation characteristics of the devices, independent of the functions of the devices, broadly and flexibly applicable to a variety of devices.

Figure 13:
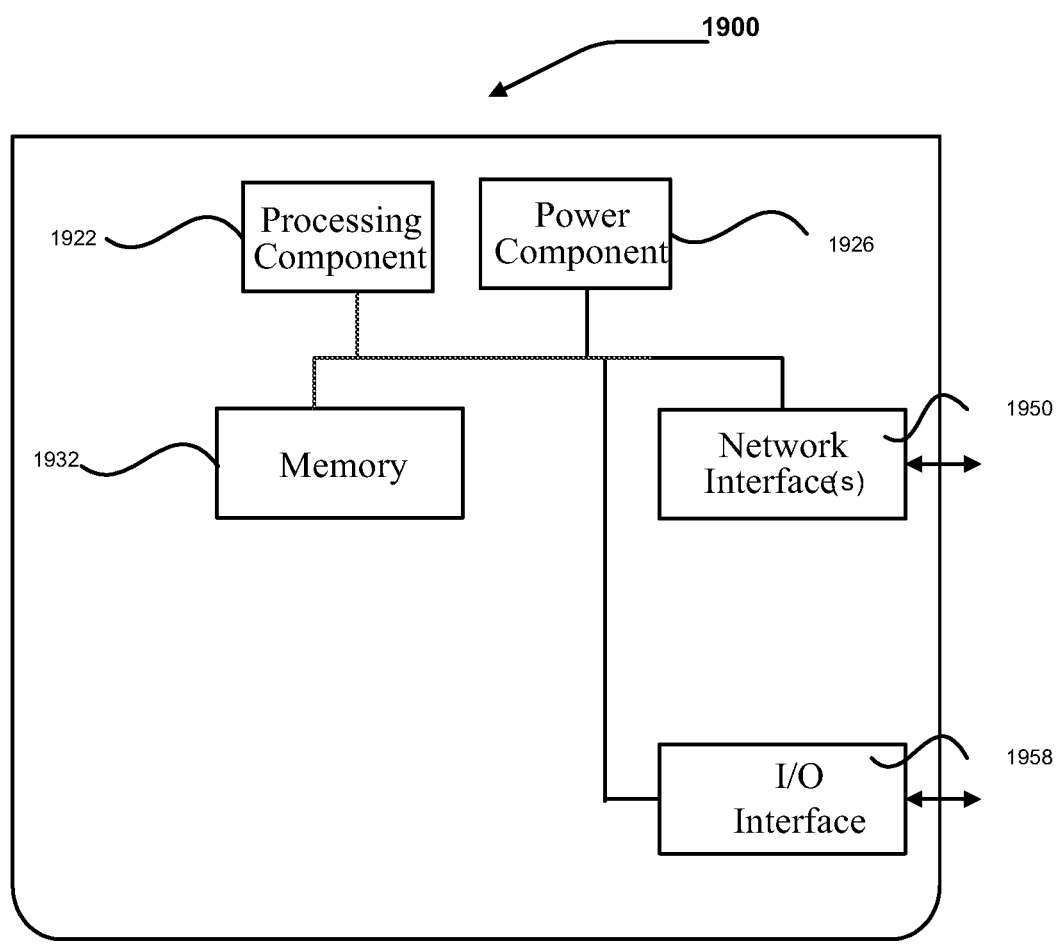
FIG. 13 is a block diagram showing a device for controlling power consumption according to another exemplary embodiment.

FIG. 13 is a block diagram of a device 1900 for controlling power consumption according to an exemplary embodiment. For example, the device 1900 may be provided as a server. Referring to FIG. 13, the device 1900 includes a processing component 1922 that further includes one or more processors, and memory resources represented by a memory 1932 for storing instructions executable by the processing component 1922, such as application programs. The application programs stored in the memory 1932 may include one or more modules each corresponding to a set of instructions. Further, the processing component 1922 is configured to execute the instructions to perform the method provided by any of the above embodiments.

The device 1900 may also include a power component 1926 configured to perform power management of the device 1900, wired or wireless network interface(s) 1950 configured to connect the device 1900 to a network, and an input/output (I/O) interface 1958. The device 1900 may operate based on an operating system stored in the memory 1932, such as Windows Server™, Mac OS X™, Unix™, Linux™, FreeBSD™, or the like.

In the above device provided by the present embodiment, a monitoring scheme is determined based on a type of an operating system. It is monitored in real time whether the system currently has a task to perform according to the monitoring scheme, The system is switched to a reduced power mode when it is determined in real time that the system currently has no task to perform. Thereby, a common power consumption management can be implemented in uniform and brief software architecture. It can facilitate development of a framework, distribution of SDK. Moreover, it can eliminate the need to analyze specific operation characteristics of the devices, independent of the functions of the devices, broadly and flexibly applicable to a variety of devices.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for controlling the power consumption of an electronic device by a power control device, comprising:
   determining a type of an operating system of the electronic device, wherein the operating system types comprise at least a foreground-background system or a real-time system supporting preemption and the types are mutually exclusive;
   determining a monitoring scheme based on the type of operating system;
   if the operating system type is a foreground-background system, monitoring in real time whether the operating system currently has a task to perform based on whether the task is currently triggered by an interrupting event, and switching the electronic device to a reduced power mode if there is no task currently triggered by an interrupting event;
   if the operating system type is a real-time system, monitoring in real time whether a process, other than a switch to reduced power mode process, is triggered by an interrupting event, and switching the electronic device to a reduced power mode if there is no process other than a switch to a reduced power mode process triggered by an interrupting event; and wherein switching the electronic device to the reduced power mode comprises ceasing power supply to a designated peripheral device and ceasing the power supply to a peripheral clock while lowering a frequency of a processing component, and lowering a supply voltage to the processing component, wherein the designated peripheral device is a peripheral device that is not in operation, and the peripheral clock and the designated peripheral device are connected to a processing component via a peripheral interface, and wherein the interrupting event has a highest priority in the real-time system and preempts the priority of a process to switch the electronic device to a reduced power mode.

2. The method of claim 1, wherein the operating system of the electronic device is determined to be the foreground-background system, and the determined monitoring scheme is to monitor in real time whether the interrupting event is triggered in foreground.

3. The method of claim 1, wherein the operating system of the electronic device is determined to be the real-time system supporting preemption, and the determined monitoring scheme is to monitor in real time the process based on a priority level of the process.

4. The method of claim 1, wherein the method further comprises: when the interrupting event occurs, terminating the reduced power mode and processing the task or process triggered by the interrupting event.

5. A power control device for controlling power consumption of an electronic device, comprising:
a processor; and
a memory for storing instructions executable by the processor, wherein the processor is configured to perform:
determining a type of an operating system of the electronic device, wherein the operating system types comprise at least a foreground-background system or a real-time system supporting preemption and the types are mutually exclusive;
determining a monitoring scheme based on the type of the operating system;
if the operating system type is a foreground-background system, monitoring in real time whether the operating system currently has a task to perform based on whether the task is currently triggered by an interrupting event, and switching the electronic device to a reduced power mode if there is no task currently triggered by an interrupting even;
if the operating system type is a real-time system, monitoring in real time whether a process, other an a switch to reduced power mode process, is triggered by an interrupting event, and switching the electronic device to a reduced power mode if there is no process other than a switch to a reduced power mode process triggered by an interrupting event; and
wherein switching the electronic device to the reduced power mode comprises ceasing power supply to a designated peripheral device and ceasing the power supply to a peripheral clock while lowering a frequency of a processing component and lowering a supply voltage to processing component, wherein the designated peripheral device is a peripheral device that is not in operation, and the peripheral clock and the designated peripheral device are connected to a processing component via a peripheral interface, and wherein the interrupting event has a highest priority in the real-time system and preempts the priority of a process to switch the electronic device to a reduced power mode.

6. The power control device of claim 5, wherein the operating system of the electronic device is determined to be the foreground-background system, and the determined monitoring scheme is to monitor whether the interrupting event is triggered in foreground.

7. The power control device of claim 5, wherein the operating system of the electronic device is determined to be the real-time system supporting preemption, and the determined monitoring scheme is to monitor in real time the process based on a priority level of the process.

8. The power control device of claim 5, wherein the processor is further configured to perform: when the interrupting event occurs, terminating the reduced power mode and processing the task or processed triggered by the interrupting event.

9. A non-transitory computer-readable storage medium storing instructions that, when being executed by a processor of a power control device, cause the power control device to control the power consumption of an electronic device by performing:
determining a type of an operating system of an electronic device, wherein the operating system types comprise at least a foreground-background system or a real-time system supporting preemption; determining a monitoring scheme based on the type of operating system and the types are mutually exclusive;
if the operating system type is a foreground-background system, monitoring in real time whether the operating system currently has a task to perform based whether the task is currently triggered by an interrupting event, and switching the electronic device to a reduced power mode if there is no task currently triggered by an interrupting event;
if the operating system type is a real-time system, monitoring in real time whether a process, other than a switch to reduced power mode process, is triggered by an interrupting event, and switching the electronic device to a reduced power mode if there is no process other than a switch to a reduced power mode process triggered by an interrupting event; and
wherein switching the electronic device to the reduced power mode comprises ceasing power supply to a designated peripheral device and ceasing the power supply to a peripheral clock while lowering a frequency of a processing component and lowering a supply voltage to a processing component, wherein the designated peripheral device is a peripheral device that is not in operation, and the peripheral clock and the designated peripheral device are connected to a processing component via a peripheral interface, and wherein the interrupting event has a highest priority in the real-time system and preempts the priority of a process switch the electronic device to a reduced power mode.

10. The non-transitory computer-readable storage medium of claim 9, wherein the operating system of the electronic device is determined to be the foreground-background system, and when the determined monitoring scheme is to monitor in real time whether the interrupting event is triggered in foreground.

11. The non-transitory computer-readable storage medium of claim 9, wherein the operating system of the electronic device is determined to be the real-time system supporting preemption, and the determined monitoring scheme is to monitor in real time the process based on a priority level of the process.

12. The non-transitory computer-readable storage medium of claim 9, wherein the power control device is further caused to perform: when the interrupting event occurs, terminating the reduced power mode and processing the task or process triggered by the interrupting event.

* * * * *